United States Patent
Zorine

(12) 
(10) Patent No.: US 6,691,725 B2
(45) Date of Patent: Feb. 17, 2004

(54) FUEL VAPOR VENT VALVE WITH PEEL-OFF MECHANISM FOR ENSURING REOPENING

(75) Inventor: Maxim V. Zorine, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 49 days.

(21) Appl. No.: 10/014,481

(22) Filed: Dec. 14, 2001

(65) Prior Publication Data

US 2003/0111111 A1 Jun. 19, 2003

(51) Int. Cl.$^7$ ................................................ F16K 24/04
(52) U.S. Cl. ........................ 137/2; 137/43; 137/202
(58) Field of Search ........................ 137/2, 43, 202

(56) References Cited

U.S. PATENT DOCUMENTS

| | | | |
|---|---|---|---|
| 5,960,817 A | * | 10/1999 | Johansen et al. ........... 137/202 |
| 6,371,146 B1 | * | 4/2002 | Benjey ........................ 137/202 |
| 6,508,263 B1 | * | 1/2003 | Jahnke et al. ................ 137/202 |

* cited by examiner

*Primary Examiner*—Gerald A. Michalsky
(74) *Attorney, Agent, or Firm*—Roger A. Johnston

(57) ABSTRACT

A float operated fuel vapor vent valve for use in a vehicle fuel tank. The float has a membrane valve caged for lost motion movement on the top of the float. Upon refueling, the float rises and seals the membrane on a vent port valve seat. A projection extending downwardly from the top of the cage contacts the membrane to peel away a localized area of the membrane valve from the valve seat to ensure re-opening upon the float descending as fuel is withdrawn from the tank.

9 Claims, 2 Drawing Sheets

FUEL VAPOR VENT VALVE WITH PEEL-OFF MECHANISM FOR ENSURING REOPENING

BACKGROUND OF THE INVENTION

The present invention relates to vapor vent valves of the type employed in fuel tanks filled with volatile fuel for operating an internal combustion engine and for which it is desired to control the emission of fuel vapors during periods in which the engine is not operating.

Heretofore, fuel tank vapor vent valves have had problems with valve failure in arrangements where the rising level of the liquid fuel in the tank closes the valve outlet which is connected to the vent port through the wall of the tank. In particular, in such arrangements, upon withdrawal of fuel, problems have been encountered with the valve sticking and failing to reopen. A relatively large valve area is required to provide the desired vapor flow at low vapor pressures. Where a relatively low valve closing force is available from the float it has been necessary to use a relatively flexible and soft valve member which can be effectively seated on a valve surface with the available relatively low closing force.

A known float operated valve has employed a relatively thin flexible membrane valve member to effectuate closing with a relatively low closing force acting thereon. However, problems have been experienced with such valves upon the tank being completely filled with liquid fuel with the valve sticking closed or "corking". Subsequently, when fuel is withdrawn and the float descends to a level intended to reopen the valve, the increased vapor pressure acts to continue to hold the membrane valve member closed on the valve seat.

Thus, it has long been desired to provide a way or means of ensuring a positive reopening of flow operated fuel vent valve having a relatively thin flexible valve member which seals readily upon the vent port seat with the available low closing forces from the float and which will positively reopen without sticking upon fuel withdrawal the float descending to the level wherein vapor venting is required.

BRIEF SUMMARY OF THE INVENTION

The present invention solves the above described problem by providing a float actuated fuel vapor vent valve having a flexible elastomeric membrane type valve member caged for limited lost motion movement on the float assembly, with the upper portion of the cage having a downwardly extending projection for effecting localized peeling of the valve member from the valve seat upon lowering of the float assembly due to withdrawal of the liquid fuel from the tank. A preferred form of the float assembly has the cage formed with an inclined upper portion to effect peeling away of one side of the membrane from the valve seat thereby minimizing the force required to continue reopening of the valve on further lowering of the float assembly to ensure complete re-opening.

DETAILED DESCRIPTION OF THE INVENTION

Figure 1:
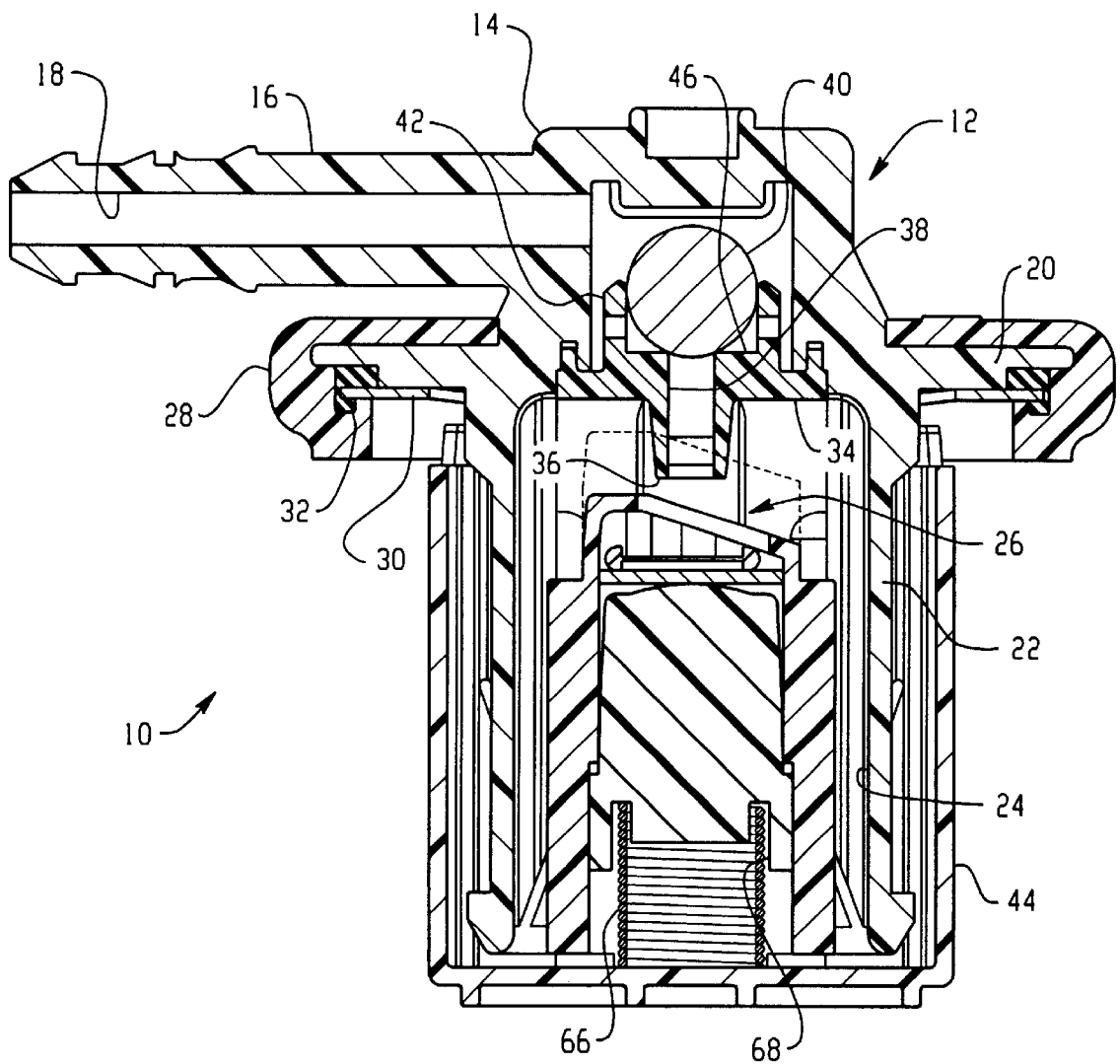
FIG. 1 is a cross-section of the valve assembly employed in the present invention; and, FIG. 2 is an enlarged view of the float assembly employed in the valve of FIG. 1.

Referring to FIG. 1, the valve assembly of the present invention is indicated generally at 10 and includes a body or housing indicated generally at 12 which includes an upper portion 14 intended to be disposed externally of the fuel tank and which includes a hose fitting 16 having formed therein a vapor outlet passage 18. The upper portion 14 of the housing includes an outwardly extending annular flange portion 20. The valve body 12 further includes a downwardly extending portion 22 which is intended to extend into the interior of the fuel tank through the access opening (not shown) provided the tank; and, the portion 22 has formed therein a float cavity 24 which has slidably received therein a float assembly indicated generally at 26.

The outward extending flange 20 formed on the upper portion 14 has an annular attachment flange 28 disposed thereover preferably by plastic overmolding and which includes a support or retainer ring 30 which engages flange 28 and the portion 22. An elastomeric seal material 32 is formed over the outer periphery thereof and which forms a substantially vapor impervious seal between the flange 20 and the overmold 28. It will be understood that overmold 28 is adapted for weldment to a plastic tank of similar material.

A valve seat member 34 is disposed in body 12 and includes an annular valve seat 36 formed on the lower end of a valving passage 38 extending vertically through member 34. The upper end of the passage 38 has seated thereon a preferably spherical gravity responsive check valve 40 which is positioned thereon by an annular retaining wall 42 preferably formed as part of the valve seat member 34.

The lower portion of the body 22 has received thereover a guard or cover 44 which, in the presence practice of the invention, preferably has a cup shaped configuration, or alternatively a U-shaped configuration, and which may be secured over the lower portion of the body 22 with any suitable expedient such as by snap locking engagement or by weldment.

The upper end of the vapor passage 38 has at least one, and preferably a plurality, of cross grooves 46 formed thereon to permit a minimum bleed flow of fuel vapor when the check valve 40 is registered against the end of the passage 38. In the event of excessive vapor pressure in the tank, the downward force of the weight of the check valve 40 is overcome by the pressure acting over the area of the seated valve; and, this pressure causes the valve 40 to move upwardly increasing the flow area to relieve the pressure.

Figure 2:
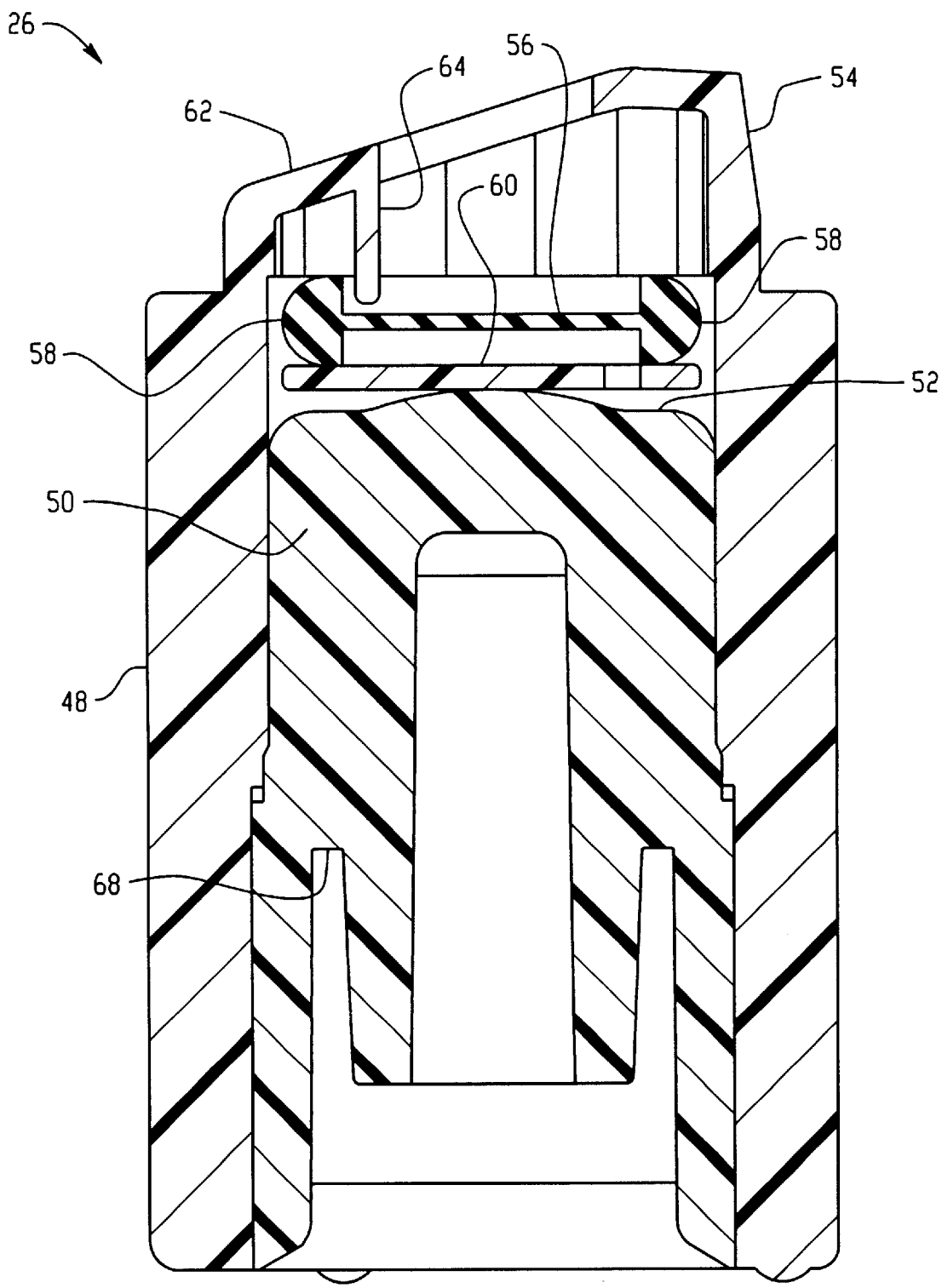

Referring to FIG. 2, the float assembly 26 is shown in greater detail and includes a body having a generally annular or tubular configuration denoted by reference numeral 48 with a core 50 disposed therein and which preferably has a curved surface 52 formed on the upper end thereof. The core 50 may be secured within the body 48 by any suitable expedient as for example by snap locking or by weldment.

The body 48 has a cage 54 formed on the upper end thereof in which is received a resilient flexible valve member denoted by reference numeral 56 preferably having a relatively thin membrane configuration and preferably with an annular bead rim 58 disposed about the outer periphery thereof and preferably formed integrally therewith. A rigid plate or disk 60 is disposed under the valve member 58 and is seated on the curved surface 52 for pivotal movement thereon and extends outwardly to contact the bead 58 to provide a registration or seating surface therefor.

The cage 54 has the upper end 62 thereof inclined at an angle to the axis of the float body 48; and, the upper end 62 of the cage includes a downwardly extending projection 64 which is preferably located adjacent the inner periphery of the bead 58. The projection 64 is operative to provide localized contact and deflection of the membrane 56 upon downward movement of the float assembly 26 as will be herein after described in greater detail. It will be understood that the cage 54 is of sufficient height from the core 52 to permit limited relative motion or lost motion therein of the valve member 56 and the disc 60.

Referring to FIG. 1, the float assembly is biased upward by a spring 66 having its lower end registered against the inside of the cup 44 with the upper end of the spring 66 registered in an annular grooves 68 formed in the lower end of the core 50.

In operation, as the fuel level in the tank rises, the float is moved upwardly to the position shown in dashed outline in FIG. 1 whereupon the valve member or membrane 56 contacts the valve seat 36, and is sealed thereagainst by the disc 60 pressing against the peripheral bead 58 of the membrane as the curved surface 52 of the float core contacts the under surface of the disc 50.

Upon withdrawal of fuel from the tank and the lowering of the fuel level, the float assembly 26 is lowered causing the projection 64 to contact locally a portion of the valve member or membrane 56 to effect localized peeling of that portion of the valve member 56 from the valve seat 36 thereby preventing the valve member or membrane 56 from sticking against the valve seat 36. Further downward movement of the float assembly 26 causes the underside of the top 62 of the cage to contact the bead rim 58 of the valve member and effect a further peel away of one side thereof. Upon further lowering of the float assembly 26 the upper or higher portion of cage 62 contacts the side of membrane valve member rim 58 opposite projection 64 and effects complete opening of the valve member from the seat 36.

The present invention thus provides, a unique and novel construction for a float operated fuel vapor vent valve having a relatively thin resilient valve member mounted within a cage on the float for limited lost motion on the float for sealing on a stationary vapor vent valve seat as the float rises. Upon withdrawal of fuel and lowering of the float, a downwardly extending projection on the float cage contacts a localized area of the valve membrane and causes the localized area to be peeled away from the valve seat thereby preventing the valve from remaining in a completely closed condition. Upon further lowering of the float, the cage peels this member 56 completely away from the valve seat.

Although the invention has hereinabove been described with respect to the illustrated embodiments, it will be understood that the invention is capable of modification and variation and is limited only by the following claims.

What is claimed is:

1. A vapor vent valve assembly for a fuel tank comprising:
   (a) a housing defining a vent passage and a valve seat at one end of said passage;
   (b) a float assembly associated with the housing and guided for movement with respect thereto, and including a cage with a resilient seal member captured therein for limited lost motion with respect thereto, said seal positioned for contacting said valve seat upon said float assembly rising in response to the fuel level rising to a certain level; and,
   (c) said float assembly further including a downwardly extending projection operable for contacting and effecting localized deflection of said seal away from contact with said valve seat upon the fuel level decreasing below said certain level and said float assembly descending.

2. The vent valve assembly defined in claim 1, wherein said resilient seal has a relatively thin circular configuration.

3. The vent valve assembly defined in claim 1, wherein said resilient seal has a relatively thin configuration with an enlarged peripheral bead formed therearound.

4. The vent valve assembly defined in claim 1, wherein said resilient seal has a relatively thin configuration with an annular bead formed integrally about the periphery thereof.

5. The vent valve assembly defined in claim 1, wherein said cage has an upper portion thereof inclined to the direction of the fluid level.

6. The vent valve assembly defined in claim 1, wherein said cage has said downwardly extending projection formed integrally therewith.

7. A method of controlling vapor venting in a fuel tank comprising:
   (a) providing a vent port through the wall of the tank and providing an annular valve seat about the vent port;
   (b) caging a resilient seal for limited lost motion on a float and disposing said float for moving said seal to contact said valve seat upon upward float movement;
   (c) disposing a downwardly extending projection on the cage and contacting the seal locally with the projection and effecting a localized peel-away movement of the seal from the valve seat upon downward float movement.

8. The method defined in claim 7, wherein said step of caging includes forming a cage on the float and disposing a relatively thin disc within the cage.

9. The method defined in claim 8, wherein said step of disposing a disc includes forming an annular bead about the periphery of the disc.

* * * * *